W. ROBBINS & A. H. TIMMERMAN.
SYSTEM OF ELECTRICAL CONTROL.
APPLICATION FILED DEC. 11, 1911.
1,068,702.
Patented July 29, 1913.
5 SHEETS—SHEET 4.
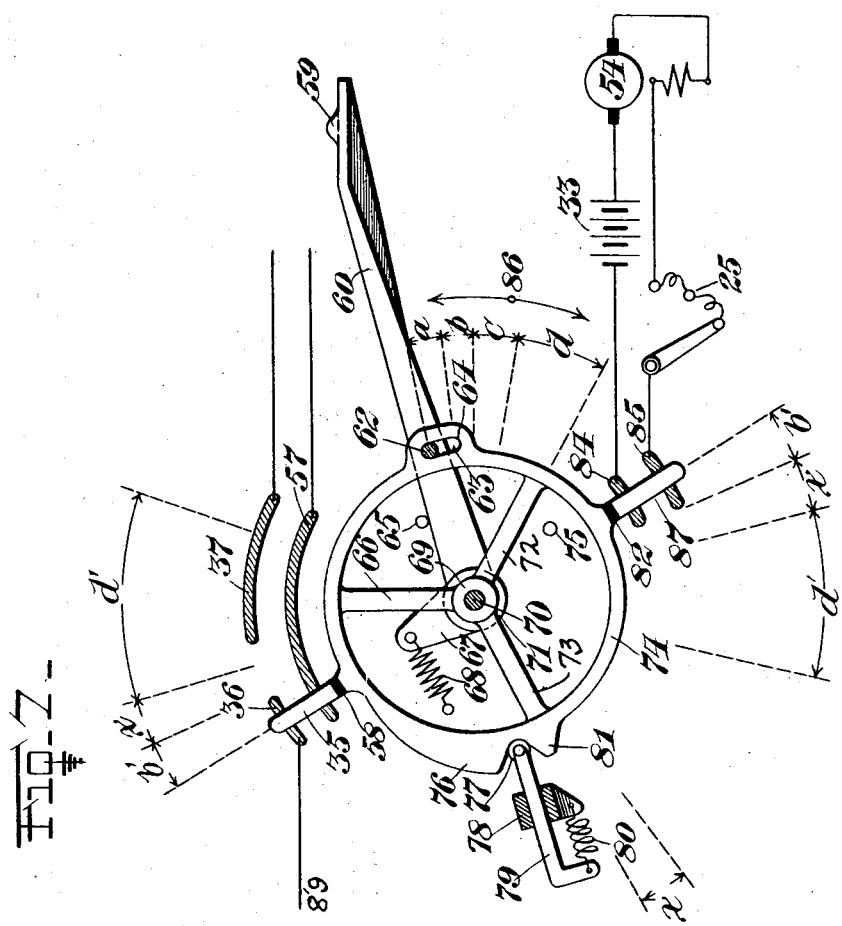
WITNESSES:
Chas. A. Becker,
W. A. Alexander.
INVENTORS:
Walter Robbins and
Arthur H. Timmerman,
BY
E. E. Huffman
Their ATTORNEY.

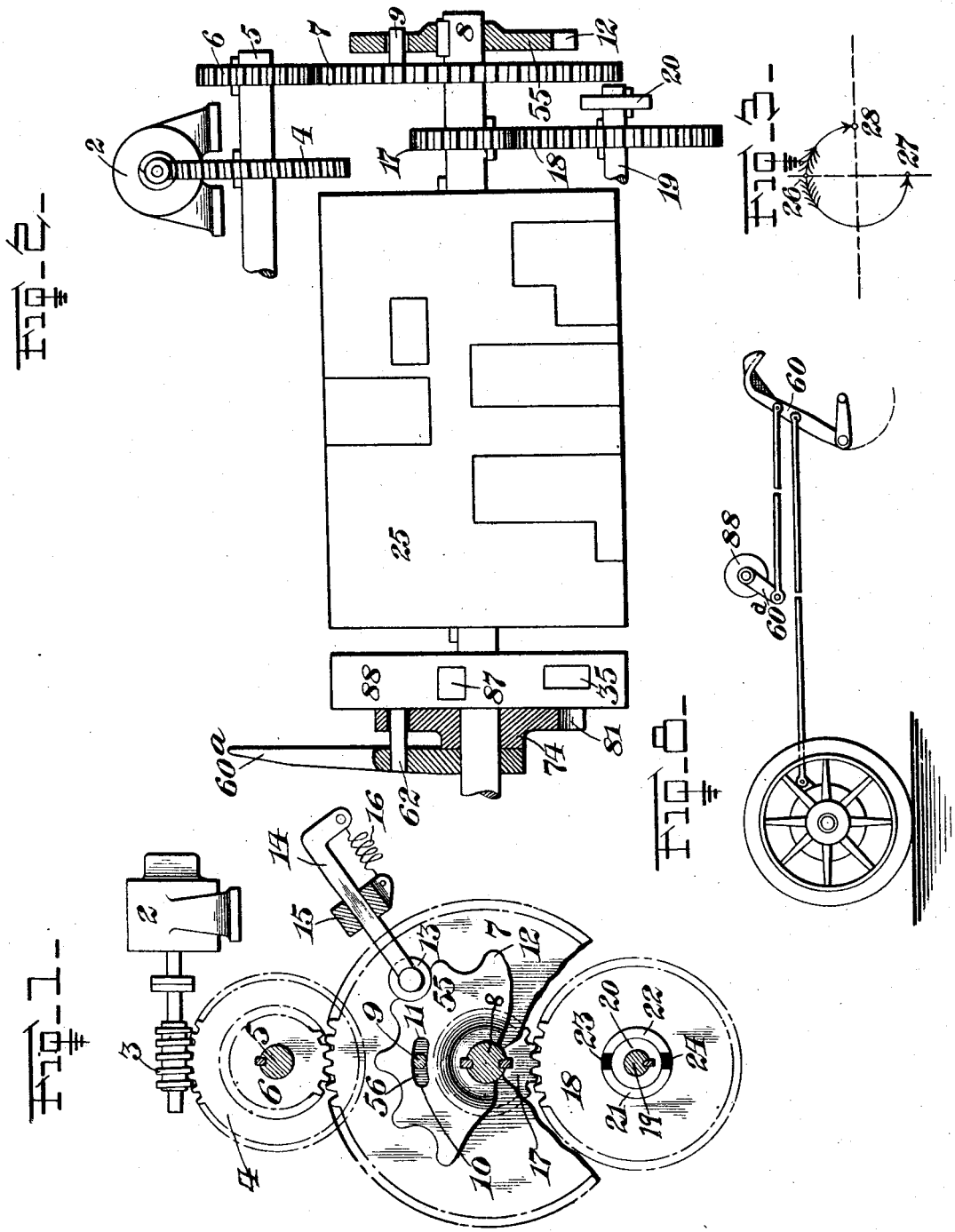

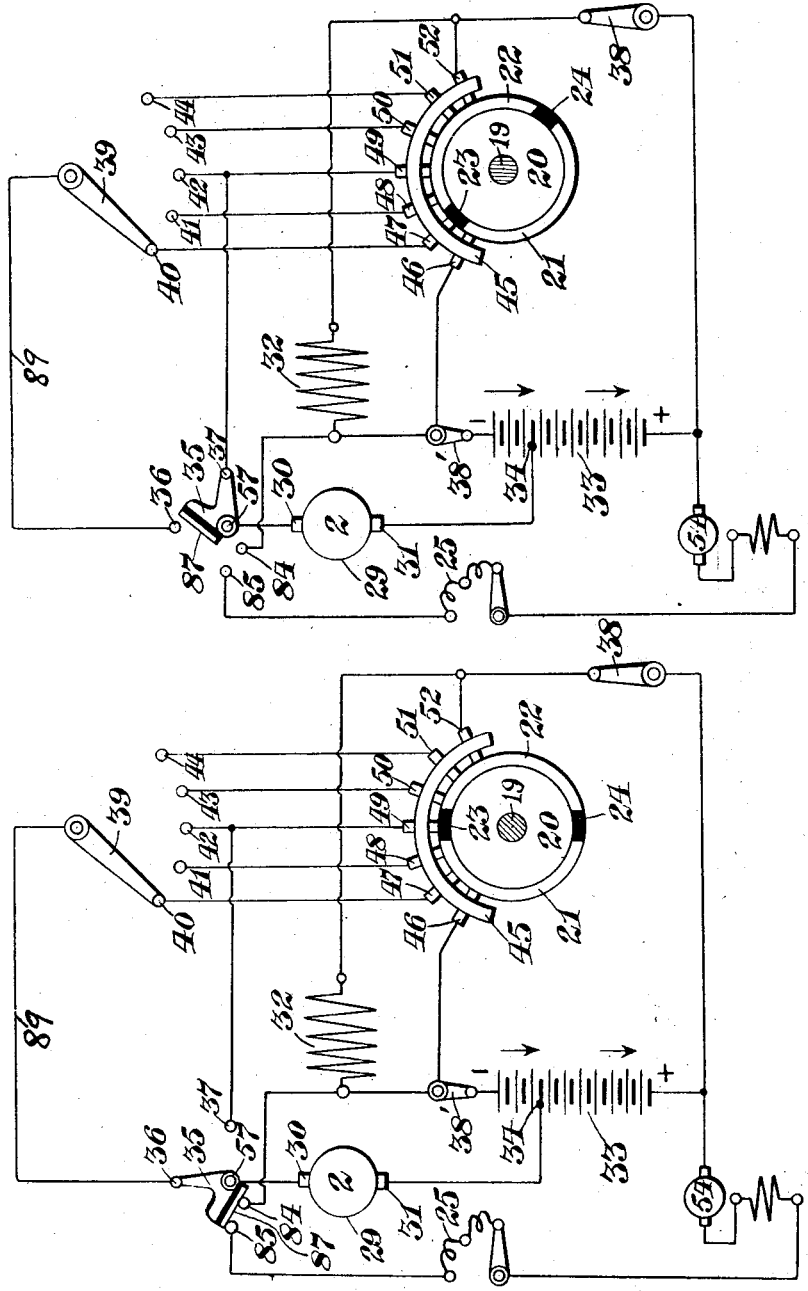

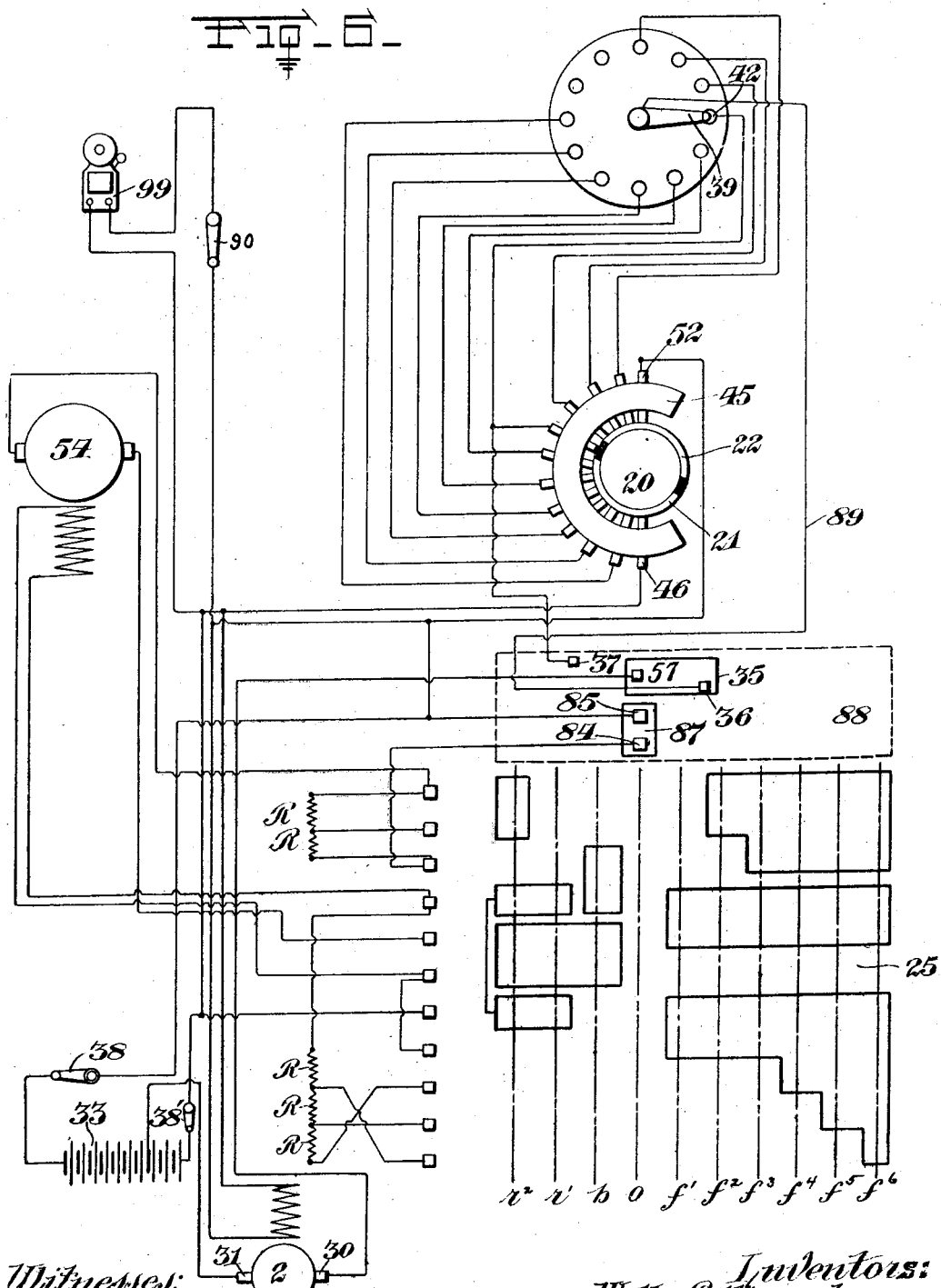

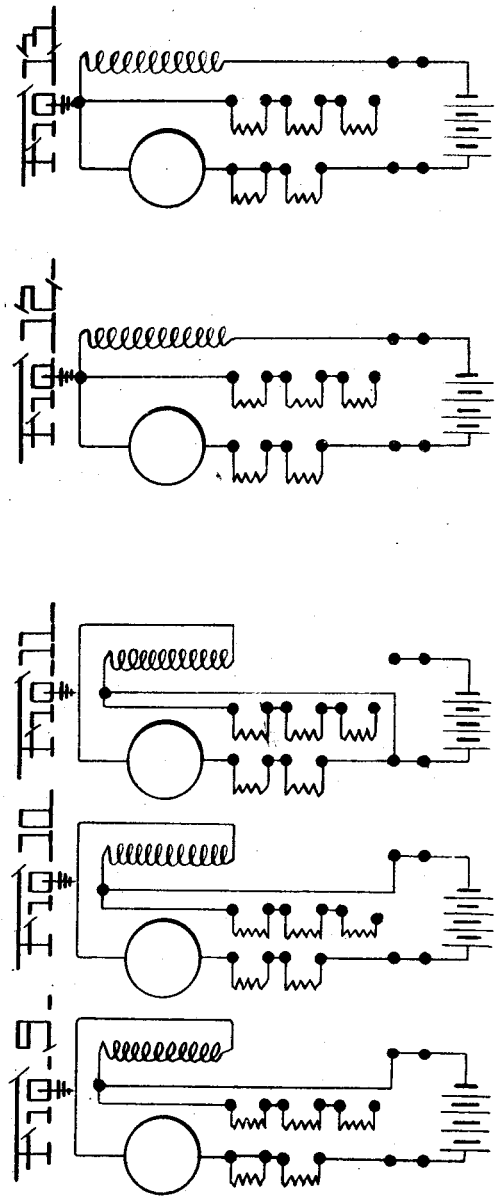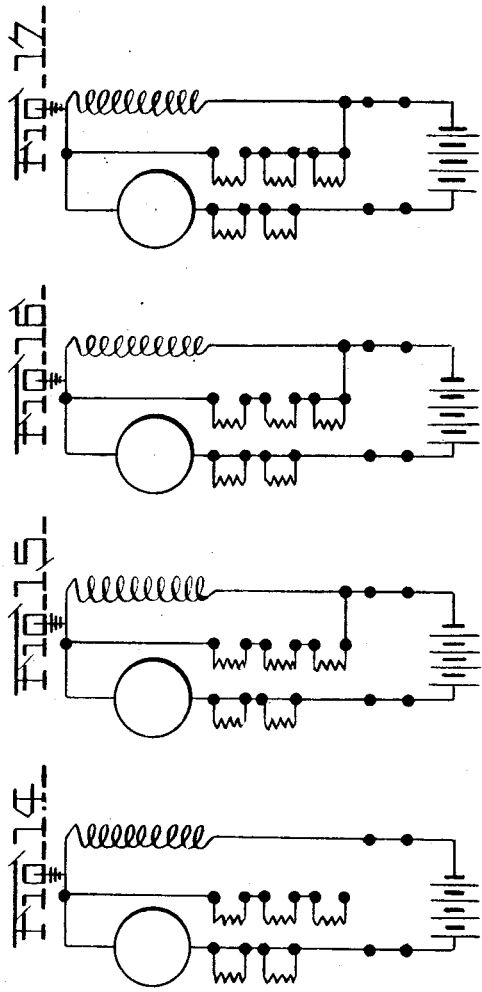

UNITED STATES PATENT OFFICE.

WALTER ROBBINS AND ARTHUR H. TIMMERMAN, OF ST. LOUIS, MISSOURI, ASSIGNORS TO WAGNER ELECTRIC MANUFACTURING COMPANY, OF ST. LOUIS, MISSOURI, A CORPORATION OF MISSOURI.

SYSTEM OF ELECTRICAL CONTROL.

1,068,702.  Specification of Letters Patent.  Patented July 29, 1913.

Application filed December 11, 1911. Serial No. 665,130.

*To all whom it may concern:*

Be it known that we, WALTER ROBBINS and ARTHUR H. TIMMERMAN, citizens of the United States, residing at St. Louis, Missouri, have invented a certain new and useful System of Electrical Control, of which the following is such a full, clear, and exact description as will enable any one skilled in the art to which it appertains to make and use the same, reference being had to the accompanying drawings, forming part of this specification.

Our invention relates to electrically actuated controlling mechanism and connections therefor, and is particularly applicable to electrically propelled vehicles, being used for the purpose of enabling the driver to fully control his vehicle with a minimum amount of labor and a maximum amount of safety and positiveness.

The main objects of that form of our invention, which is particularly suited for use on electric vehicles, are to deprive the operator of the power to increase the rate of acceleration of the motor beyond a predetermined amount; to prevent the operator from suddenly reversing the direction of rotation of the driving or main motor; to so interlock the mechanism which applies the mechanical brakes to the vehicle wheels with the controlling circuits of our improved apparatus as to cause the source of energy to be disconnected from the driving motor preferably before the brake is applied; to cause the main controller for the driving motor to be returned to its "off" position as soon after the brake has been applied as possible; to keep the main controller in its "off" position at least until the brake is released, and also to provide means whereby the main controller will, under certain circumstances, be returned to the position it occupied before the brake was applied even if the application of said brake did not last a sufficiently long time for the main controller to have reached its "off" position.

Other objects and advantages of the invention will appear from the following detailed description taken in connection with the accompanying drawings in which—

Figure 1 is an end view partly in elevation and partly in section showing the driving mechanism for the main controller: Fig. 2 is a side elevation of the main controller drum and associated parts: Fig. 3 is an explanatory diagram; Figs. 4 and 5 are simplified diagrams of the preferred form of electrical connections of our apparatus; Fig. 6 shows a complete diagram of said electrical connections: Fig. 7 diagrammatically represents the foot brake of the vehicle and the switches it controls: Fig. 8 is a diagram illustrating an arrangement of the apparatus in which the foot brake of the vehicle is connected to an emergency controller loosely mounted on the shaft of the main controller, this emergency controller being provided with contacts for controlling the circuits as shown in Figs. 6 and 7; Figs. 9, 10, 11, 12, 13, 14, 15, 16 and 17 represent the changes in connections between the main motor, the resistances R, and the battery, effected by the several positions of the main controller.

In the form of our invention illustrated in the drawings the apparatus comprises a battery 33; a main motor 54 for propelling the vehicle; a main controller 25 of the usual construction for the purpose of changing the connections between the battery, the resistances and the main motor; an auxiliary motor 2 adapted to actuate the main controller; a locating or circuit interrupting switch 20 in circuit with the auxiliary motor and mechanically connected to the main controller; an operator's switch or master controller 39 with which the switch 20 normally coöperates; and an emergency controller 38 adapted to be actuated by the brake lever of a vehicle and when actuated to open the main motor circuit and also establish a resetting circuit through the auxiliary motor and circuit interrupting switch whereby the main controller will be driven toward its initial or "off" position.

Referring first to the mechanical features of the apparatus, the shaft 8 of the main controller 25 carries a ratchet wheel 55 keyed to said shaft and provided with large teeth 12 and a slot 56. Loosely mounted on the shaft 8 is a gear wheel 7, provided with a pin 9 engaging with the slot 56 of the ratchet wheel 55. This wheel 7 is driven by the auxiliary motor 2 through the agency of the worm 3 coupled to the motor shaft, the worm wheel 4 coöperating with said worm, the shaft 5 on which the worm wheel 4 is keyed, and the pinion 6 engaging the gear wheel 7 and also keyed on the shaft 5. It is thus seen that the torque of the motor 2 is transmitted to the ratchet wheel 55 and the shaft 8 through the agency of the pin 9 fixed to the gear wheel 7. Since the round pin 9 coöperates with a long slot, and not a close fitting round opening, there will be a certain amount of lost motion between the shaft of the motor 2 and the shaft 8 of the main controller 25. This lost motion is provided for the purpose of securing a snap motion of the controller shaft 8, thus causing the circuits of the main and of the auxiliary motors to be broken and made quickly. This snap motion is produced through the coöperation of the ratchet wheel 55 and the ratchet 14, illustrated in Fig. 1. This ratchet comprises a stem 14 guided by a stationary sleeve 15 and provided at one end with a roller 13 engaging with the notches of the ratchet wheel 55. The roller 13 is pressed into yielding contact with the ratchet wheel by means of a spring 16. When the motor 2 is set in motion, the gear wheel 7 together with the pin 9 can travel a certain distance in either direction before the pin 9 actually engages the wheel 55. During this time the ratchet wheel 55 and with it the shaft 8 of the main controller 25 are held stationary by the roller 13 pressed into a notch of the wheel 55 by means of the spring 16. If the direction of rotation is such that the pin 9 eventually comes into contact with the side 10 of the slot 56, then the ratchet wheel 55 is carried in a counterclock direction, forces the roller 13 out of the particular notch it occupies and up the side of the tooth located to the right of said roller, until the roller reaches the top of said tooth. A very slight additional forward movement of the ratchet wheel 55 will now cause the roller 13 to engage with the opposite and downwardly sloping side of the tooth on which it is standing. Once the roller 13 gets into this position, the spring 16 quickly forces said roller down into the next notch, thus rapidly jerking the ratchet wheel 55 in a counterclock direction and well ahead of the pin 9. This rapid motion of the ratchet wheel 55, and consequently of the shaft 8 of the main controller 25, breaks and makes the contacts on the main controller and the locating switch in the desired rapid manner, and also brings the side 10 of the slot 56 out of engagement with the pin 9.

The locating switch 20 consists of a disk of insulating material mounted on the shaft 19 and carrying a metallic ring divided into two portions 21, 22, insulated from each other by some suitable insulating material 23, 24, and adapted to coöperate with a number of contacts, illustrated in Figs. 4 and 5, and which will presently be more particularly described. This locating switch is geared to the shaft 8 by means of the pinion 17 keyed to said shaft engaging the gear wheel 18 keyed to the shaft 19. The locating switch 20 can be mounted on the shaft 8 in case the drum of the main controller, which is supposed to be keyed to the shaft 8, is to be revolved through less than 180 degrees. But in case said drum is to be revolved through a larger angle, and such is usually the case, then we prefer to introduce a reduction gear between the shaft 8 and the locating switch 20. The drums of main controllers are usually revolved through about 270 degrees, as shown in Fig. 3, and we therefore prefer, as shown in Figs. 1 and 2, to introduce between the shafts 8 and 19 a reduction of about 2 to 1.

The electrical circuits are so constituted, and the locating switch is so geared to the main shaft 8, that the circuits of the auxiliary motor 2 are always interrupted at or near the time when the roller 13 has reached the top of a tooth 12 and begins its journey down that tooth on the opposite side. Because of a certain amount of kinetic energy stored in the armature of the auxiliary motor and in the various moving parts of the transmission gear between said armature and the shaft 8, the auxiliary motor will not come to a stop immediately after its working circuit has been interrupted; a little time will be required for the accumulated energy to be dissipated in friction losses. This slight overrunning of the auxiliary motor is also taken care of to a great extent by the lost motion feature.

Loosely mounted on the main controller shaft 8 is an emergency controller 88 provided with two contact segments 35 and 87 coöperating with the contact fingers as shown in Fig. 6. This emergency controller is held in position by a pawl or ratchet 79 coöperating with a single notch in wheel 74, as illustrated in Fig. 7, and is provided with an actuating lever 60ª connected to the brake lever 60 of a vehicle as shown in Fig. 8. The lever 60ª is also loosely mounted on the shaft 8 and moves the controller 88 by means of the pin 62 coöperating with a slot in wheel 74 in a manner more fully illustrated in Fig. 7.

*Controlling circuits.*—Fig. 6 is a complete diagram of the electrical connections and circuits of our control system. The operator's switch or master controller 39 is provided with any desired number of contacts by means of which the speed and direction of rotation of the main motor may be controlled. When the master controller is moved to any contact the auxiliary motor controlled through the locating or circuit interrupting switch 20 moves the main controller 25 to a corresponding position and this action will always take place, regardless of the positions of the various parts of the system when the master controller is operated. The master controller is, however, rendered inoperative when the emergency controller is moved from its normal position, since the contact segment 35 is then moved out of contact with the common lead 89. It will also be noted in connection with this figure that when the emergency controller is actuated the main motor circuit is broken by reason of the contact plate 87 moving out of engagement with the contact fingers 84 and 85.

The dotted line $r^2$ indicates the position of the main controller for the second speed of the main motor in the direction for backing the vehicle; $r'$ for the first speed in the same direction; $b$ the position of the controller in which the main motor is caused to act as a brake; $o$ the "off" position of the controller; and $f'$ to $f^6$ the positions for the various speeds forward.

The main motor circuits established by the various positions of the main controller are shown in Figs. 9 to 17, Fig. 9 represents the circuits established when the controller is in the second reverse position; Fig. 10 the first reverse position; Fig. 11 the brake position; and Figs. 12 to 17 the various forward positions.

99 is a warning bell which can be rung when desired by closing a switch 90 preferably placed on or near the operator's switch or master controller 39.

The operation of the main controller, circuit interrupting switch and auxiliary motor, will be described with more particular reference to the simplified circuit diagrams shown in Figs. 4 and 5. The operating or selecting switch 39, which is placed within easy reach of the operator, has a number of contacts, 40, 41, 42, 43, 44; each of these contacts being electrically connected to a corresponding number of contacts 47, 48, 49, 50, 51, held within an insulating frame or segment 45 and adapted to coöperate with the locating switch 20 mounted on the shaft 19 and geared to the shaft 8 of the main controller 25 in the manner already described in connection with Figs. 1 and 2. In addition to the contacts already referred to, the insulating frame 45 carries two additional contacts 46 and 52, to which is permanently connected the field winding 32 of the auxiliary motor 2, the armature of which is shown in Fig. 4 at 29, connection therewith being had by means of the brushes 30 and 31. The storage battery 33 used for propelling the vehicle, or, for that matter, any other source of E. M. F., is also connected to the contacts 46 and 52. A switch 38 is located between the contact 52 and the positive pole of the storage battery 33. A similar switch 38' is located between the contact 46 and the negative pole of the battery. The armature 29 of the auxiliary motor is connected between the operator's switch 39 and a point 34 of the battery 33. This point 34 is preferably asymmetrically disposed with reference to the two ends or poles of the battery 33. Included in the armature circuit of the auxiliary motor is a switch 35 adapted to connect the brush 30 either to the contact 36, as shown in Fig. 4, or to the contact 37, as shown in Fig. 5, this contact 37 being in electrical connection with the "off" contacts 42 and 49 of the operator's and locating switches. This same switch 35, which we prefer to interlock with the foot brake, also controls the circuit of the main motor 54 interrupting same at the points 84, 85 when said switch is thrown from point 36 to point 37. The blade 87 of switch 35 which bridges points 84 and 85 is insulated from the rest of the switch. The circuit of the main motor 54 runs from the latter to the positive pole of the battery, through said battery to points 84 and 85 to the main controller 25 (shown as an adjustable resistance in Figs. 4 and 5) and back to the main motor. It is assumed in Figs. 4 and 5 that the "off" contacts of the operator's and locating switches are the points marked 42 and 49. It may be further assumed that the points 40 and 41 of the operator's switch and the corresponding points on the locating switch will determine positions of the main controller for which the circuits of the main motor are organized for propelling the vehicle in a forward direction, while the contacts 43 and 44 of the operator's switch and the corresponding contacts of the locating switch will determine main controller positions for which the main motor circuits will be organized to produce a retrogressive motion of the vehicle. One or more of the available contacts can be selected to place the main controller in a position for which the main motor circuits will be organized to produce a braking action. Suppose for a moment that the lever of the switch 39 in Fig. 4 stands on the "off" point 42, that the locating switch 20 is in the position shown and is so keyed on the shaft 19 that one of the insulated portions of its periphery, say 23, stands opposite the "off" contact 49 when the drum of the main controller is in the "off" position, that switches 38 and 38' are closed and that switch 35 stands on point 36; then it will be clear that the field winding 32 of the auxiliary motor will be connected across the full voltage of the battery 33, while the conducting half-ring 21 of the locating switch 20 will be connected by way of the contact 46 to the negative pole of the battery, and the half-ring 22 of said switch will be connected by way of contact 52 to the positive pole of the battery. As long as the lever 39 remains on the "off" contact 42, all the circuits but that of the field winding of the motor will be open. The field winding 32 remains connected to the battery as long as switches 38 and 38' are closed. If now the lever 39 be placed on point 40 of the operator's switch, as shown in Fig. 4, the armature circuit of the auxiliary motor will be closed, as follows: from the negative pole of the battery 33 through the switch 38', the contact 46, the negative half-ring 21, the contacts 47 and 40, the lever 39, the switch 35, the armature 29, and back to the battery 33 at the point 34. The gearing between the auxiliary motor and the shafts 8 and 19 is supposed to be so arranged that, when the current enters the armature 29 at the brush 31 and leaves it at the brush 30, the locating switch 20 is revolved in a counterclock direction. Immediately after the armature circuit of the auxiliary motor has been closed by placing switch 39 on point 40, said motor begins to revolve and carries with it the gear wheel 7 which is loose on the shaft 8 and therefore does not carry said shaft with it. The pin 9 which is fixed to the wheel 7 does, however, progress in a clockwise direction and finally comes into contact with the side 11 of the slot 56. At this instant the shafts 8 and 19 begin to move, the latter revolving counterclockwise and carrying the locating switch 20 with it. The spring controlled roller 13 engaging with the ratchet wheel 55 gradually rides up the side of the tooth located on its left, reaches the top of that tooth, and then speeds down into the next notch momentarily propelling the ratchet wheel 55, and consequently also the locating switch 20, more rapidly than the gear wheel 7. When the roller 13 reaches the bottom of the next notch it arrests the progress of the shafts 8 and 19 and also of the locating switch 20, the latter now occupying a position which brings the insulating piece 25 opposite the stationary contact 48. Reference to Fig. 4 shows that this altered position of the locating switch has not in any way altered the connections established by placing the switch 39 on point 40; in consequence, the auxiliary motor will continue to revolve and the pin 9 will very soon again come into contact with the side 11 of the slot 56 and will further impel the locating switch in a counterclock direction. The operation just described will repeat itself, the roller 13 again climbing a tooth of the wheel 55 and consequently quickly descending into the next notch of that wheel, thus again jerking the locating switch forward, bringing the side 11 away from and ahead of the pin 9, and placing the insulated part 23 of switch 20 opposite the stationary contact 47. As soon as the locating switch has reached this last position, the armature circuit of the auxiliary motor is interrupted and the machine very soon comes to rest. The time necessary for the auxiliary motor to come to rest, after its armature circuit has been interrupted, depends, among other things, on the speed at which the machine was being driven and on the amount of friction present in the gearing located between the auxiliary motor and the shaft 8. It is generally found easy to so select the various constants that the auxiliary motor will come to rest before the pin 9 has caught up with the side 11 of the slot 56, which side was propelled ahead of the pin 9 at or about the time when the armature circuit of the auxiliary motor was interrupted. But should the adjustment in this respect be disturbed for one reason or another, then it will be found that the electrical connections made use of are so constituted as to automatically correct any such mistake, thus positively eliminating any possibility of the locating switch effectively overshooting that position which the operator intends it to occupy, and which he predetermines by means of the switch 39. Should the switch 20 so far overshoot its mark, in the case illustrated in Fig. 4, as to carry the insulating piece 23 beyond the stationary contact 47, thus connecting said stationary contact to the positive half-ring 22, then the armature circuit of the auxiliary motor will again be closed, but this time the circuit will be as follows: from the positive pole of the battery 33 through switch 38, contact 52, half-ring 22, to contacts 47 and 40, through switches 39 and 35, through armature 29 and back to the battery at the point 34. In this connection the current traverses the armature from brush 30 to brush 31, thus causing the locating switch to be revolved in a clockwise direction, which will bring it back to the point which it had previously overshot. Should the motion of 20 in a clockwise direction not be checked in time, then the half-ring 21 will very soon come into contact with the stationary point 47, which will cause the auxiliary motor to again reverse, with the result that the locating switch 20 might, under unfavorable conditions, oscillate about any position which it is supposed to occupy, but will not be allowed to progress materially to either side of this position, with the result that the drum of the main controller will actually remain in the position selected for it by switch 39. Had the switch 39 been placed on point 44 instead of point 40, then the armature circuit would have been completed through point 51, the positive half-ring 22, point 52, switch 38, the positive terminal of the battery 33, the point 34, the armature 29, the switches 35 and 39, and back to point 44. In this connection the current flows through the armature from brush 30 to brush 31, and the locating switch 20 is therefore revolved in a clockwise direction. For the reasons already stated in connection with the position of switch 39 on point 40, the locating switch will only revolve in the clockwise direction until the insulating piece 23 comes under the stationary contact 51, when the armature circuit of the auxiliary motor will be interrupted.

We so arrange and control the electrical circuits in our apparatus that the locating switch 20 will always revolve at one speed when moving in a clockwise direction, and at another speed when moving in a counter-clock direction. This result is achieved by connecting one of the armature brushes to a point of the storage battery which is asymmetrically situated with respect to the terminals of said battery. Thus the point 34 of Fig. 4 is connected so as to include 3 cells of the storage battery between the armature and the negative pole of the battery, while including 7 cells between the armature and the positive terminal of the battery. A practically constant speed of the locating switch is secured for either direction of rotation, and irrespective of the work to be performed, by connecting the exciting winding 32 of the auxiliary motor in parallel with the source of energy. While it is not necessary to asymmetrically connect the armature of the auxiliary motor to the source of energy, yet we prefer to do so, particularly when applying our invention to the control of a motor vehicle, for the reason that it is, as a rule, preferable to have the main controller move slowly when accelerating the main motor in such a direction as to propel the vehicle forward, and to have the main controller move rapidly when moving in the opposite direction, i. e., either returning from the "full forward" to the "off" position, or when going from the "off" position in the direction of the "full back" position.

The switches 38 and 38' are so located that when opened they will preclude the possibility of the auxiliary motor being operated; in other words, of the locating switch and the main controller being moved by any kind of manipulation of the operator's switch 39. In applying our invention to an electrically propelled vehicle, we prefer to control at least one of these switches by means of a lock and key, thus placing the operator in the position of making it impossible for an unauthorized party to handle his vehicle in his absence. If only one of these switches is to be operated then we prefer to select switch 38 for this purpose, because switch 38' may be left closed without necessarily permitting the auxiliary motor to be operated. Reference to Fig. 5 shows that when switch 38 is open and switch 38' is closed, certain manipulations of the selecting switch can connect the armature and the field winding of the auxiliary motor in series between the negative pole of the battery 33 and the point 34 thereof; but this small voltage will as a rule not be able to force enough current through the series connected motor to cause same to overcome the friction of the gearing of the mechanism.

*Emergency control.*—An important feature of our invention is indicated in Figs. 2, 5, 6 and 8, is more clearly illustrated in Fig. 7, and consists in providing means for returning the locating switch 20 and the main controller 25 to their "off" positions from any of their other possible positions, and quite irrespective of the location of the lever of the operator's switch 39. This object is achieved by means of the switch 35 corresponding to the emergency controller 88 of Figs. 2, 6 and 8. Suppose that the operator's switch has been placed on point 40 and that the locating switch 20 has responded by placing itself in the position indicated in Fig. 5—then this locating switch and the main controller 25, or any other piece of apparatus which happens to be connected to said locating switch, will be returned toward a position corresponding to the "off" position of the locating switch 20, which position is indicated in Fig. 4, as soon as switch 35 has been moved from the point 36 to the point 37, as shown in Fig. 5. Furthermore, the circuit of the main motor 54 will be interrupted at the points 84 and 85, as soon as switch 35 leaves point 36. Following out the connections brought about by this switching operation, when carried out under the conditions indicated in Fig. 5, it is seen that the armature circuit of the auxiliary motor, which was open as long as switch 35 stood on point 36, is closed by said switching operation, as follows: Starting from brush 30 the circuit is traced through switch 35, contact 49, positive half-ring 22, contact 52, switch 38, battery 33, point 34 thereof, and back to the armature 29 by way of the brush 31. This determines the flow of current through the armature 29 from brush 30 to brush 31 and causes the locating switch 20 to revolve in a clockwise direction. This revolution will be stopped in the manner already fully described as soon as the insulating piece 23 comes to stand under the stationary contact 49. Here again the locating switch may oscillate about this position, in case the auxiliary motor should continue to revolve longer than it ought to, but this oscillation will not bring about a sufficient movement of the main controller to reorganize the connections of the main motor. In applying our invention to electrically propelled road vehicles, we prefer to interlock this switch 35 or the emergency controller 88 corresponding thereto with the foot brake, in such a manner that said switch will snap over from the point 36 to point 37 every time that the pedal controlling the foot brake is depressed and the brake is applied. It is, of course, clear that this switch 35 can instead be operated by hand or interlocked with any other part of the mechanism carried on the vehicle, but the fact of interlocking same with a foot brake affords the driver certain advantages which are very desirable. This combination of the foot brake with the switch 35 for instance, enables the operator to control the speed of his vehicle within a very wide range, and by the use of the foot brake only, thus leaving his hands entirely free. This feature is of great importance when steering the vehicle through congested traffic. Reference to Fig. 5 will show that, if the operator's switch is left on point 40, or on any other point but 42, the transfer of switch 35 from point 36 to point 37 will always interrupt the circuit of the main motor at once and will bring the locating switch to the "off" position if the switch 35 is kept on point 37 for a sufficient length of time to enable the locating switch to travel the distance involved. Similarly, the transfer of switch 35 from point 37 to point 36 will always close the circuit of the main motor at once and will eventually return the locating switch 20 to the position called for by the operator's switch 39. Thus if point 40 corresponds to the "full on forward" position of the main controller 25, then the operator can not only slow down his car or bring it to a standstill by depressing a foot brake linked to switch 35, thus throwing switch 35 from point 36 to point 37; but he can also bring his car back to its original speed simply by releasing that brake, which operation will throw the switch 35 from point 37 to point 36. While the operator is thus enabled to stop his car as rapidly as the application of the foot brake will permit him to do so, yet he is not in a position to accelerate his car at a rate in excess of that which has been predetermined at the time of establishing the connections between the auxiliary motor and the source of energy, for as soon as the switch 35 is placed on point 36, the operator's switch regains control, those connections being reëstablished which prevailed in Fig. 4, and the main controller will move forward until the locating switch reaches the position it occupied before the brake was applied. A very material advantage of our improved resetting arrangement is the fact, clearly apparent from Fig. 5, that the switch 35; however operated, can be replaced on point 36 at any convenient instant and as soon as desired after it was shifted over on to point 37 without in any way disturbing the operation of the system. Throwing switch 35 from point 36 to point 37 starts the locating switch 20 back in the direction of its "off" position. Throwing switch 35 from point 37 to point 36 starts the locating switch back in the direction of that position which is determined by the operator's switch 39, and this last movement of the locating switch will be at once initiated and eventually performed whether the latter has already reached the "off" position toward which it was traveling or is still moving in that direction.

One method of controlling switch 35 by means of a foot brake is diagrammatically indicated in Fig. 7. The brake lever 60 is pivoted on the shaft 70, is provided with a pedal 59, and is normally held in the position indicated in the figure by the spring 68 attached to the projection 67 of the brake lever 60. The stop 65 limits the travel of the brake lever in the direction in which it is impelled by the spring 68, while the stop 75 limits the travel of said lever in the opposite direction, and is set sufficiently far ahead not to interfere with the brake action. The arc normally traversed by the foot brake lever is indicated by arcs $a$, $b$, $c$, and $d$, the two directions in which it can move are indicated by the double arrow 86. The wheel 74 (with the hub 69 and the arms 66, 72 and 73) is loosely mounted on the same shaft as the brake lever 60 and has on its periphery a slot 63 engaging with a pin 62 fixed to the brake lever 60. This wheel 74 also carries switch blades 35 and 87, insulated from that wheel by the insulating blocks 58 and 82 respectively. The blade 87 closes or opens the circuit of the main motor 54 at the contacts 84 and 85, as has already been explained in connection with Fig. 5. The blade 35 connects the armature brush 30 of the auxiliary motor to the lever of the operator's switch 39 by way of the contact 36, or to the "off" point 43 of said operator's switch by way of the contact 37. The wheel 74 and the switch blades 35 and 87 are held in their normal position, which is that shown in Fig. 7, by means of a ratchet comprising a stem 79 free to slide in a holder 78 and provided at one end with a roller 77 and at the other with a spring 80. This spring 80 is also attached to the guide 78 and presses the roller 77 against the wheel 74. In the normal position of this wheel the roller 77 rests in a notch provided on the periphery of said wheel and located between a hump 76 and a tooth 81. The operation of this device is somewhat as follows: When the driver of the vehicle first depresses his foot brake, the lever thereof can travel through arc a limited by the slot 63, without causing the wheel 74 to move. When the pin 62 comes into contact with the side 64 of said slot it carries the wheel 74 with it in a clockwise direction through the arc b. This motion of the wheel 74 forces the roller 77 up the side of the tooth 81. When the roller has reached the top of that tooth, the blades 87 and 35 have traveled through the arcs b' to the edge of the contacts 84, 85 and 36 respectively. A slight additional clockwise movement of the wheel 74 will bring the roller 77 on the downward slope of tooth 81, the spring 80 will quickly propel the roller down said slope, thus jerking the wheel 74 forward through the arc x and quite independently of any movement of the foot brake lever 60; this independence of movement being guaranteed by the presence of the slot 63. It will thus be seen that the arrangement of the ratchet 79 and the tooth and notches on the wheel 74 together with the slot 63, insure a quick break between the blade 87 and the contacts 84 and 85, also between the blade 35 and the contact 36, as well as a quick make between the blade 35 and the contact 37. If the lever 60 is further depressed, the pin 62 will again come into contact with the side 64 of slot 63 after having traveled through the arc c and will continue to propel the wheel 74 in a clockwise direction until the limit of travel of the lever 60 is reached, which will be the case after the latter has traveled through the arc d. No alterations in the connections will be brought about during the travel of the lever 60 through the arc d for the reason that the blade 35 will throughout remain in contact with the segments 37 and 57, while the blade 87 will not be in contact with any circuits at all. It will thus be seen that the brake lever 60 on its downward journey can travel through arcs a and c without causing any alteration in the position of the switch blades 35 and 87, but that these switch blades move together with the brake lever 60 when the latter travels over the arcs b and d, the corresponding movements of the switch levers being over the arcs b', d'. During the interval in which the roller 77 travels from the top of the tooth 81 down the slope of that tooth in the direction of the switch blade 87 the movement of the switch blades 35 and 87 is independent of the brake lever 60, and said switch blades travel through the arc x. The relative motions between the wheel 74 and the brake lever 60 on the return journey are much the same as those above described, but this relation is of smaller importance during the upward movement of the brake lever 60 for the reason that the latter is usually released much more quickly than it is depressed.

It will of course be apparent that our control system can be applied to service other than determining the position of a controller drum, and we do not desire the scope of our invention to be limited except as set forth in the appended claims.

We claim:

1. A control system comprising a master controller, a governed member, means for actuating the same, a locating switch having a contact member movable with the governed member, means under the control of the operator for rendering the master controller inoperative and establishing a circuit through the locating switch whereby the governed member will be driven toward its initial position.

2. A control system comprising a master controller, a governed member, means for actuating the same, a source of current for the actuating means, a locating switch, and means under the control of the master controller and independent of the master controller for connecting the source of current to the actuating means through the locating switch to return the governed member toward its initial position.

3. In apparatus of the class described, the combination with a main motor and a supply circuit therefor, of a main controller for said supply circuit, an auxiliary motor for operating the said main controller, an emergency controller, and connections whereby actuating said emergency controller will open the main supply circuit and establish a circuit through the locating switch and the auxiliary motor.

4. A control system comprising a master controller, a main motor, a main controller therefor, an auxiliary motor driving said main controller, a locating switch controlling the auxiliary motor, a source of current for the main motor, an emergency switch under the control of the operator for connecting the source of current to the auxiliary motor through the locating switch to cause the main controller to be driven from any operative position toward its "off" position.

5. In an apparatus of the class described the combination of a main controller, means for actuating said main controller, a locating switch comprising a plurality of contact members, a master controller having a plurality of contact points in electrical connection with contact members of the locating switch, and means under the control of the operator for rendering the master controller inoperative and establishing connection through the locating switch whereby the main controller will be driven from any operative position toward its "off" position.

6. In an apparatus of the class described the combination of a main controller, means for actuating said controller, a locating switch comprising a plurality of contact members, a master controller having a plurality of contact points in electrical connection with contact members of the locating switch, and an emergency controller for rendering the master controller inoperative, establishing a circuit through the locating switch to cause the main controller to be driven toward its "off" position.

7. In an apparatus of the class described the combination of a main controller, means for actuating said controller, a locating switch comprising a plurality of contact members, a master controller having a plurality of contact points in electrical connection with contact members of the locating switch, and an emergency controller for rendering the master controller inoperative and establishing a circuit through the locating switch whereby the main controller operating means will be caused to drive said main controller toward its "off" position.

8. The combination with a vehicle of a brake actuating member, a driving motor, a controller therefor, an auxiliary motor for actuating the controller, and means connected with the brake member for establishing a circuit through the auxiliary motor.

9. The combination with a vehicle, of a brake actuating member, a driving motor and a controller therefor, and electromagnetic means governed by the brake actuating member whereby the controller may be driven toward its "off" position.

10. The combination with a vehicle of a brake actuating member, a driving motor and a supply circuit therefor, a controller for said circuit, an auxiliary motor for actuating the controller, and means connected with the brake member for instantaneously opening the supply circuit and simultaneously establishing connections through the auxiliary motor whereby the controller will be driven toward its initial position.

11. The combination with a vehicle of a brake actuating member, a main driving motor, a supply circuit therefor, a controller in said circuit, an auxiliary motor for actuating said controller, and an emergency controller connected to said brake member.

12. The combination with a vehicle of a brake actuating member, a main driving motor, a supply circuit therefor, a controller in said circuit, an auxiliary motor for actuating said controller, and an emergency controller connected to said brake member, said emergency controller being provided with means for opening the main motor circuit and means for establishing a circuit through the auxiliary motor.

13. In combination, a motor controller having a plurality of operative positions, an auxiliary motor for driving said controller, a source of electrical energy, and means whereby a higher voltage will be applied to at least one member of the auxiliary motor to rotate it in one direction than in the other.

14. In a control system the combination with a governed member, of means for actuating the same, a source of electrical energy, a locating switch comprising two contact members each connected to a terminal of the source of energy and a third contact member, and means for so connecting said third contact member of the locating switch to the source of energy as to make it a positive terminal with reference to one of said first named contact members and a negative terminal with reference to the other.

15. In a control system the combination with a governed member, of means for actuating the same, a source of electrical energy, a locating switch comprising two contact members each connected to a terminal of the source of energy and a third contact member, means for so connecting said third contact member of the locating switch to the source of energy as to make it a positive terminal with reference to one of said first named contact members and a negative terminal with reference to the other, and means for actuating at least one of the contact members of the locating switch when the governed member is actuated.

16. In a control system the combination with a governed member, of means for actuating the same, a source of electrical energy a locating switch comprising two movable contact members each connected to a terminal of the source of energy and a third contact member, means for so connecting said third contact member of the locating switch to the source of energy as to make it a positive terminal with reference to one of said first named contact members and a negative terminal with reference to the other, and means for making the movements of the movable contact members of the locating switch correspond to the movements of the governed member.

17. In a control system the combination with a main controller, of an auxiliary motor for actuating the same, a source of electrical energy, a locating switch in circuit with the auxiliary motor and comprising two contact members each connected to a terminal of the source of energy and a third contact member, at least one of said contact members being movable, and means for so connecting the third contact member of the locating switch to the source of energy as to make it a positive terminal with reference to one of said first named contact members and a negative terminal with reference to the other.

18. In a control system the combination with a main controller, of an auxiliary motor for actuating the same, a source of electrical energy, a locating switch comprising two contact members each connected to a terminal of the source of energy and a plurality of other contact members, and means for so connecting any one of said last named contact members of the locating switch to the source of energy as to make it a positive terminal with reference to one of said first named contact members and a negative terminal with reference to the other.

19. In a control system the combination with a main controller, of an auxiliary motor for actuating the same, a source of electrical energy, a locating switch comprising two contact members each connected to a terminal of the source of energy and a plurality of other contact members, a master controller for so connecting any one of said last named contact members of the locating switch to the source of energy as to make it a positive terminal with reference to one of said first named contact members and a negative terminal with reference to the other, and means for actuating at least one of the contact members of the locating switch when the main controller is actuated.

20. In a control system the combination with a main controller, of an auxiliary motor for actuating the same, a source of electrical energy, a locating switch comprising two contact members each connected to a terminal of the source of energy and a plurality of other contact members, and an emergency switch for so connecting one of said last named members to the source of energy as to make it a positive terminal with reference to one of said first named contact members and a negative terminal with reference to the other.

21. In a control system the combination with a main controller, of an auxiliary motor for actuating the same, a source of electrical energy, a locating switch comprising two contact members each connected to a terminal of the source of energy and a plurality of other contact members, a master controller for so connecting any one of said last named members to the source of energy as to make it a positive terminal with reference to one of said first named contact members and a negative terminal with reference to the other, and an emergency switch for temporarily rendering the master controller inoperative.

22. The combination with a vehicle of a brake actuating member, a source of energy, a driving motor, a controller therefor, means for actuating said controller, a locating switch governing the actuating means and comprising two contact members each connected to a terminal of the source of energy and a third contact member, and an emergency switch controlled by the brake actuating member and adapted to so connect the third contact member of the locating switch to the source of energy as to make it a positive terminal with reference to one of the first named contact members of said switch and a negative terminal with reference to the other.

23. The combination with a vehicle, of a brake actuating member, a driving motor and a controller therefor, means for actuating the controller, a master controller normally governing said actuating means, and an emergency switch connected to the brake member and adapted to render the master controller inoperative when the brake is applied and to restore it to control when the brake is released.

24. In a control system the combination with a main controller, of an auxiliary motor for actuating the same, a source of electrical energy, a locating switch comprising two movable contact members each connected to a terminal of the source of energy and a plurality of other contact members, a master controller for so connecting any one of said last named contact members of the locating switch to the source of energy as to make it a positive terminal with reference to one of said first named contact members and a negative terminal with reference to the other, and means for making the movements of said first named contact members correspond to the movements of the main controller.

25. In a control system the combination with a governed member, of means for actuating the same, a source of electrical energy, a locating switch comprising two contact members each connected to a point of the source of energy, a third contact member forming part of said locating switch, and means for so connecting said third contact member of the locating switch to the third point of the source of energy as to make it a positive terminal with reference to one of said first named contact members and a negative terminal with reference to the other.

In testimony whereof, we have hereunto set our hands and affixed our seals in the presence of the two subscribing witnesses.

WALTER ROBBINS. [L. S.]
A. H. TIMMERMAN. [L. S.]

Witnesses:
NAT. A. LYNN,
EMILY HENERMAN.

---

Copies of this patent may be obtained for five cents each, by addressing the "Commissioner of Patents, Washington, D. C."